(12) United States Patent
Zschunke

(10) Patent No.: US 7,139,535 B2
(45) Date of Patent: Nov. 21, 2006

(54) SIGNAL PROCESSING OF AN AMPLITUDE-MODULATED AND/OR PHASE-MODULATED HIGH-FREQUENCY SIGNAL

(75) Inventor: Willmut Zschunke, Darmstadt (DE)

(73) Assignee: Interessengemeinschaft für Rundfunkschutzrechte GmbH Schutzrechtsverwertung & Co. KG, Düsseldorf (DE)

(*) Notice: Subject to any disclaimer, the term of this patent is extended or adjusted under 35 U.S.C. 154(b) by 388 days.

(21) Appl. No.: 10/466,467

(22) PCT Filed: Jan. 16, 2002

(86) PCT No.: PCT/EP02/00391

§ 371 (c)(1),
(2), (4) Date: Jul. 15, 2003

(87) PCT Pub. No.: WO02/056497

PCT Pub. Date: Jul. 18, 2002

(65) Prior Publication Data

US 2004/0046524 A1   Mar. 11, 2004

(30) Foreign Application Priority Data

Jan. 16, 2001  (DE) ............................... 101 01 911

(51) Int. Cl.
    *H04B 1/00* (2006.01)
(52) U.S. Cl. .................. 455/110; 455/42; 455/108; 455/210
(58) Field of Classification Search ............. 455/110, 455/205, 210, 216, 313, 42, 108, 448
    See application file for complete search history.

(56) References Cited

U.S. PATENT DOCUMENTS

| 4,746,878 | A | * | 5/1988 | Cutler .......................... 331/9 |
| 5,831,679 | A | * | 11/1998 | Montgomery et al. ...... 348/473 |
| 5,901,346 | A | * | 5/1999 | Stengel et al. .............. 455/126 |
| 5,973,559 | A | * | 10/1999 | Alberty .................. 330/124 R |
| 6,133,788 | A | * | 10/2000 | Dent ....................... 330/124 R |
| 6,430,213 | B1 | * | 8/2002 | Dafesh ........................ 375/146 |
| 2003/0123526 | A1 | * | 7/2003 | Howard et al. ............. 375/147 |

FOREIGN PATENT DOCUMENTS

EP   0716526   6/1996

OTHER PUBLICATIONS

Olson S.A. et al: "LINC imbalance correction using baseband preconditiioning" Radio and Wireless Conference, 1999, Rawcon 99. 1999 IEEE Denver, CO, USA Aug. 1-4, 1999 Piscataway, NJ USA IEEE.US.

X. Zhang and L.E. Larson: "Gain and phase error-free LINC transmitter" IEEE Transactions on Vehicular Technology, Bd. 49, No. 5, Sep. 5, 2000.

(Continued)

*Primary Examiner*—Duc Nguyen
*Assistant Examiner*—Eric J. Elcenko
(74) *Attorney, Agent, or Firm*—Collard & Roe, P.C.

(57) ABSTRACT

The invention indicates a method for signal processing of an amplitude-modulated and/or phase-modulated high-frequency signal (RF signal), in which the RF signal is broken down into two signals (FM1 and FM2) by relative phase displacement by an angle $+\beta$ and $-\beta$ and the signals are amplified before they are added to form a transmission signal, and to a circuit arrangement in which the pure phase-modulated RF signal is multiplied in a first branch by $\cos \beta$ and in a second branch by $\sin \beta$ and the two signals (FM1, FM2) are obtained by respective summation and subtraction of the multiplied signals.

17 Claims, 4 Drawing Sheets

OTHER PUBLICATIONS

P.B. Kenington, "Amplifier and Transmitter Linearisation Techniques Explained" 1998 (Wireless Systems International Ltd. brochure).

D.C. Cox, "Linear Amplication with Nonlinear Components" IEEE Transactions on Communications, Dec. 1974 (pp. 1942-1948).

Kam-yuen Chan and Andrew Bateman "Linear Modulators Based on RF Synthesis: Realization and Analysis" IEEE Transactions on Circuits and Systems—1: Fundamental Theory and Applications vol. 42, No. 6, Jun. 1995 (pp. 321-333).

David J. Jennings and Joseph P. McGeehan "A high-efficiency RF transmitter using VCO-derived synthesis: CALLUM" IEEE 1998 (pp. 137-140).

* cited by examiner $$\cos(\omega_0 t+\varphi+\beta) = \cos(\omega_0 t+\varphi)\cos\beta - \sin(\omega_0 t+\varphi)\sin\beta$$

$$\cos(\omega_0 t+\varphi-\beta) = \cos(\omega_0 t+\varphi)\cos\beta + \sin(\omega_0 t+\varphi)\sin\beta$$

$$\cos(\omega_0 t+\varphi+\beta) + \cos(\omega_0 t+\varphi-\beta) = \cos(\omega_0 t+\varphi)2\cos\beta = A(t)\cos(\omega_0 t+\varphi)$$

SIGNAL PROCESSING OF AN AMPLITUDE-MODULATED AND/OR PHASE-MODULATED HIGH-FREQUENCY SIGNAL

CROSS REFERENCE TO RELATED APPLICATIONS

Applicants claim priority under 35 U.S.C. §119 of GERMAN application Ser. No. 101 01 911.4 filed on 16 Jan. 2001. Applicants also claim priority under 35 U.S.C. §365 of PCT/EP02/00391 filed on 16 Jan. 2002. The international application under PCT article 21(2) was not published in English.

The invention relates to a method of signal processing of an amplitude-modulated and/or phase-modulated high-frequency signal (RF signal) and to a circuit arrangement for carrying out the method.

It is known that signals with a constant envelope curve can be amplified in a very power-efficient manner in non-linear end stages, this being used in, for example, the GSM method. The amplifier can in that case be operated in the so-termed class C operation, i.e. without static current. Then only the positive or negative signal components are thereby used for level control of the end stage. By contrast thereto, in the case of so-termed class A operation a working point is selected in the linear region of the amplifier characteristic curves so that positive and negative signal components are equally amplified, for which purpose, however, a power-consuming working point has to be selected. In mobile radio apparatus, GSM apparatus, UMTS apparatus and others a power-saving end stage operation is a precondition for the service life of apparatus with charging by a battery or an accumulator. However, power-efficient end stages are of advantage not only for mobile apparatus, but also for radio transmitters which emit program signals with high power.

The future increased utilisation of the mobile radio network by the UMTS system (Universal Mobile Telecommunications Systems) as well as the frequency bands defined for UMTS will allow future bandwidths to appear increasingly available, so that there will be departure from modulation methods with constant envelope curve. In order to be able to efficiently amplify the corresponding amplitude-modulated and phase-modulated signals, linear amplifiers came into question which, however, are not power-efficient.

An overview of current amplification techniques for portable telephones or mobile linear radio power amplifiers is described in the company brochure of the company Wireless Systems International Ltd., of Bristol, UK, with the title "Amplifier and Transmitter Linearisation Techniques Explained" by Peter B. Kennington. Amongst other things there is also mentioned in paragraph 5 of a power-efficient amplification which are to be investigated for mobile radio apparatus of the next generation. The highly efficient RF signal amplifier coming into use in that case acts as a linear amplifier, but is formed from power-efficient non-linear amplifiers, for example of class D, E or F. The known amplifier technology is usable when the envelope curve has not reached the value 0. If, thereagainst, the envelope curve is at zero, the proposed amplifier can no longer operate.

A technique is known from the same document from paragraph 6 (beginning on page 13) in which the base band sound or data signal to be amplified initially divides by means of a digital signal processor into two-phase-modulated FM oscillations. These FM signals are then amplified by means of non-linear power amplifiers and combined by means of an adder to form a linear output signal. The amplifiers used can in that be highly efficient switching amplifiers. The output of the adder delivers the amplified signal by way of an antenna matching circuit to the antenna in order to be able to be transmitted. The circuit of the adder is not power-efficient.

A technique for realisation of a linear band-pass amplification with non-linear components (LINC) is described in IEEE Transactions on Communications, December 1974, pages 1942–1948, by D. C. Cox. The envelope curve signal $A(t)$ and the phase-modulated signal $\cos(\omega_0 t + \Phi(t))$ are in that case extracted from the RF signal by means of a component separator, which is carried out by a limitation and a synchronous demodulation of the RF signal. A similar method is also indicated in IEEE Transactions on Circuits and Systems—1: Fundamental and Applications, Vol. 42, No. 6, 1995, pages 321–333, by Kam-yuen Chan and Andrew Bateman. These known methods fail when the amplitude $A(t)$ is at zero. Moreover, the exact realisation of the two amplifier branches throws up problems. These are also given in the case of the highly efficient RF amplifiers described in IEEE 1998, pages 137–140.

A method for signal processing a modulated high-frequency signal is known from U.S. Pat. No. 5,901,346, in which the high-frequency signal is broken down into two FM signals which are amplified and added again. The phase-modulated high-frequency signals with constant envelope curve are multiplied by signals 0° and 90°. The two FM signals are obtained by respective summation. Amplitude-modulated and phase-modulated signals can be efficiently amplified by the known circuit through the use of non-linear amplifiers.

Transmission equipment for high-frequency signals is known from DE 197 30 086 A1, which is constructed in accordance with the LINC principle and has two signal branches each with a respective amplifier and phase modulator. The input signal is provided on the two signal branches by means of a dividing filter. These output signals of the two signal branches are combined by means of a combiner into a summation signal. In order to be able to regulate out phase errors in the two signal branches the dividing filter is designed so that it cyclically interchanges, at a predeterminable cycle frequency, the allocation of the input signal components to the two signal branches. The amplitude modulation, which is produced by the cyclic interchange of the input signal components, of the summation signal is detected and, in dependence thereon, so changed in phase in at least one of the signal branches that the amplitude modulation is minimal.

Proceeding from the state of the art the invention has the object of indicating a method and a circuit which do not have the discussed problems, are particularly power-efficient and allow amplification of modulated signals even in the case where the envelope curve thereof runs towards or through zero.

This object is met by the method indicated in claim 1 and by realisation of a circuit according to claim 16 for carrying out the method.

In principle, in the method according to the invention the RF signal is similarly split into two FM signals and, in particular, as is known from the last-mentioned specification, by phase displacement relative to the RF signal by an angle $+\beta$ and $-\beta$, wherein the projection of the FM signal onto the original RF signal yields, in sum, the RF signal. These signals are directly amplified and then fed to an adder. The generation thereof is novel. As is later explained by reference to the figures, for formation of the two FM signals in principle the phase-modulated RF signal, which is kept to a constant envelope curve A(t), is multiplied by cos β and sin β and the thus-obtained orthogonal components are each fed to an adder and a subtracter, from the outputs of which the two RM signals (FM1 and FM2) can be tapped. However, as still to be shown this multiplication is undertaken on the low-frequency side. The advantage is given by this method in the case of digital signal processing that the signal processing takes place in the low-frequency base-band region and thus can be realised entirely digitally and free of drift. A substantially higher degree of stability is thereby given. A simple multiplication can be realised by the special frequency relationship between the scanning frequency and the carrier frequency.

Advantageous method steps, which can be regarded as supplementary, are indicated in subclaims 2 to 15 and advantageous embodiments of the circuit in subclaims 17 to 22. The method is also usable for signal processing for pure amplitude modulation (radio). One of the two input signals ($x_1$ and $x_2$) is zero for this case.

BRIEF DESCRIPTION OF THE DRAWINGS

The invention is explained in more detail in the following on the basis of the figures illustrated in the drawing in which:

In FIG. 1 there is shown a vector diagram which illustrates how in principle any amplitude-modulated and phase-modulated RF signal can be broken down into two FM signals. As can be recognised, for this purpose the two FM signals have to be displaced in phase relative to the original signal by an angle +β and −β. The projection thereof on the original signal yields, in sum, the signal A(t). The actual angle position relative to the abscissa is determined by the angles $\Phi_1$ and $\Phi_2$ (not illustrated) which result from the angle $\Phi+\beta$ and $\Phi-\beta$, as is apparent from the formula indicated adjacent to FIG. 1.

Figure 1:
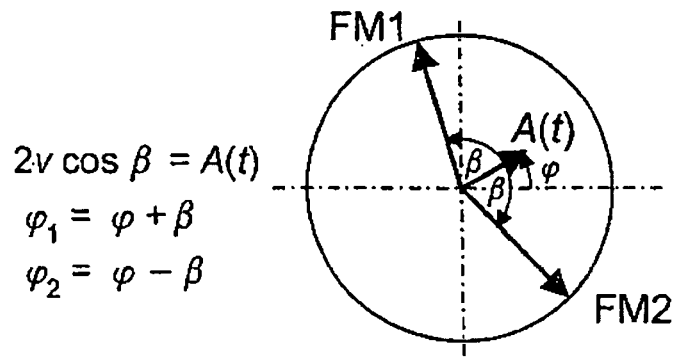
FIG. 1 shows a vector diagram which illustrates how in principle any amplitude-modulated and phase-modulated RF signal can be broken down into two FM signals.
Figure 2:
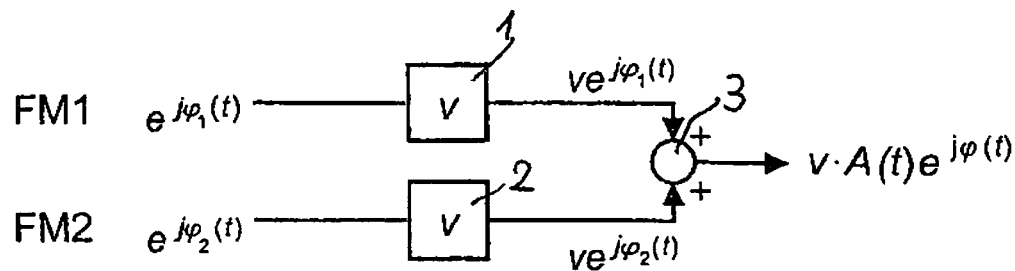
FIG. 2 shows a circuit arrangement illustrating the two split-up FM signals applied to two non-linear amplifiers.

A circuit arrangement is illustrated in FIG. 2 from which it is apparent that the two already split-up signals FM1 and FM2 which are indicated in exponential illustration as $e^{j\Phi_1(t)}$ and $e^{j\Phi_2(t)}$ input magnitudes, are applied to two non-linear amplifiers 1 and 2, the outputs of which are connected with the inputs of an adder 3, at the output of which the combined amplified signal, which is composed of the two components, can be tapped. This signal, too, is indicated in exponential illustration ($v \cdot A(t)e^{j\Phi(t)}$).

Figure 3:
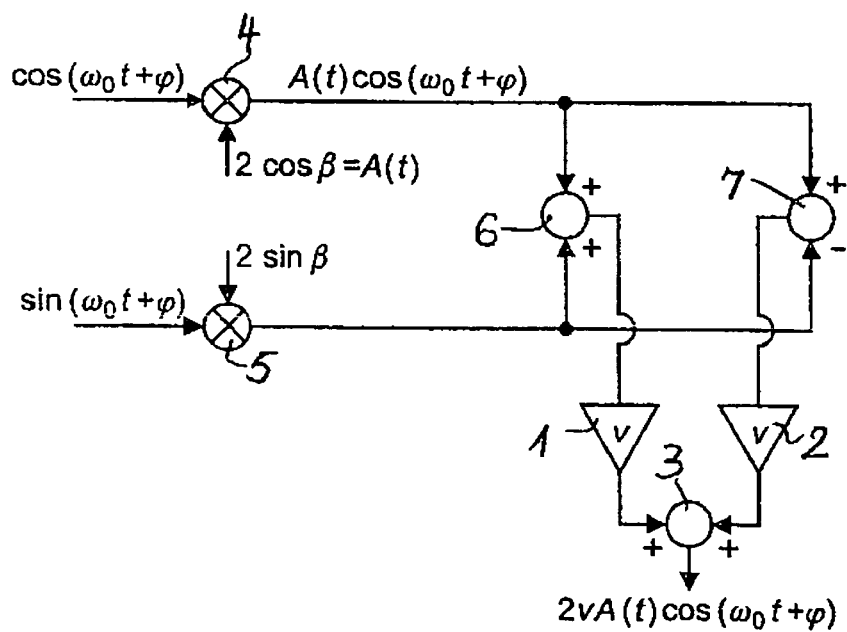
FIG. 3 shows a circuit diagram illustrating how the two FM signals are obtained from two orthogonal phase-modulated signal of constant envelope curve.

It is apparent from the circuit diagram in FIG. 3 how the two FM signals are obtained from two orthogonal phase-modulated signals of constant envelope curve by multiplication by cos β and sin β through summation and subtraction. The orthogonal signals $\cos(\omega_0 t+\Phi)$ and $\sin(\omega_0 t+\Phi)$ are applied to the inputs of two multiplication circuits 4 and 5. In the multiplication circuit 4 the signals are modulated in amplitude by 2 cos β=A(t). The output signal is designated at the output of the multiplication circuit 4. In the multiplication circuit 5 the input signal is multiplied by 2 sin β. The two outputs of the multiplication circuits 4 and 5 are each connected with an adder 6 and a subtracter 7, which are connected in parallel. The FM1 signal is taken from an output of the adder 6 and is non-linearly amplified by the downstream amplifier 1. The amplifier circuit 1 corresponds with that in FIG. 2. The signal FM2 is tapped off from the subtracter 7 and, after amplification by the non-linear amplifier 2, applied to the second input of the adder 3. The signal $2vA(t)\cos(\omega_0 t+\Phi(t))$ can be tapped off at the output of this adder 3. It is apparent from a derivative equation that the multiplication by cos β can be omitted if the RF signal $\cos(\omega_0 t+\Phi)$ is used directly. The derivative equations are indicated in FIG. 3 in terms of formulae for the FM1 signal, the FM2 signal and the output signal.

Figure 4:
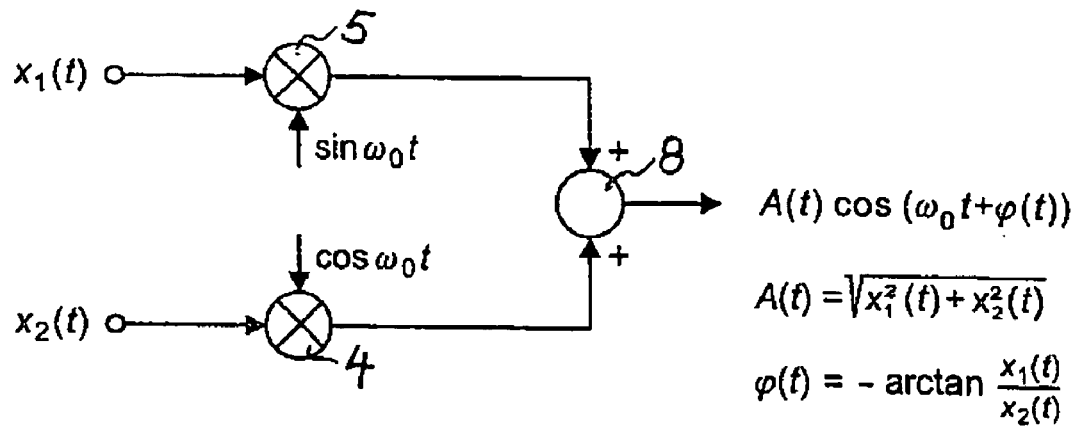
FIG. 4 shows an arrangement for realization of amplitude-modulated and phase-modulated signals by a quadrature modulation.
Figure 5:
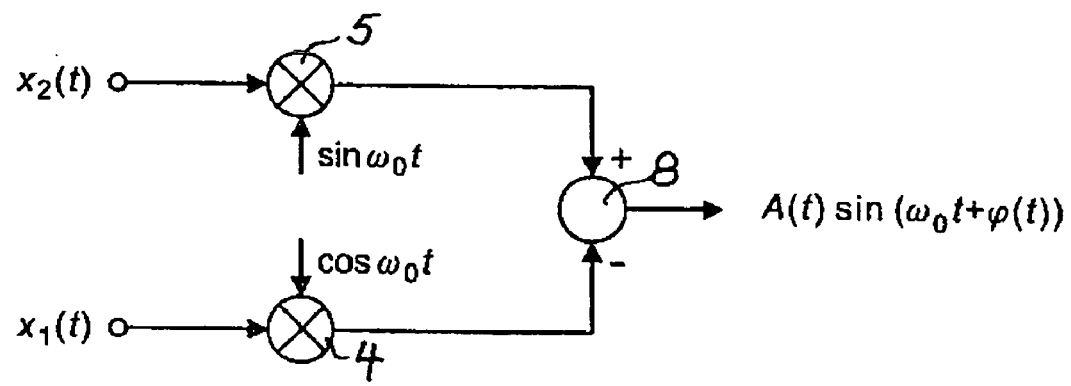
FIG. 5 shows an arrangement illustrating how through a somewhat different connection, a signal, which is orthogonal to the output signal of FIG. 4, with the same phase modulation can be realized.

Realisation of the two mutually orthogonal phase-modulated, as well as also amplitude-modulated, signals takes place according to FIGS. 4 and 5.

FIG. 4 shows an arrangement for realisation of amplitude-modulated and phase-modulated signals by a quadrature modulation. The signals $x_1(t)$ and $x_2(t)$ are usually filed as scanning values in memories (ROM) in the mobile radio method. The modulation is so undertaken in rational manner by the sine and cosine in the multipliers 4 and 5 that the carrier frequency amounts to a quarter of the scanning frequency. Thereby only multiplications by +1 and −1 and 0 result. This means that multiplication and addition are very simple. The signals $x_1$ and $x_2$ are switched through in alternation, wherein the sign changes with each second value. The two output signals of the multipliers 4 and 5 are combined in the adder 8 to form the output signal $A(t)\cos(\omega_0 t+\Phi(t))$.

FIG. 5 shows how, through a somewhat different connection, a signal, which is orthogonal to the output signal of FIG. 4, with the same phase modulation can be realised. The circuit substantially corresponds with that in FIG. 4. However, the amplitude herein is similarly A(t).

In order to obtain a signal of constant amplitude 1, it would be necessary to divide by A(t), which would, however, lead to problems if this were undertaken at the point of multiplication by sin β when the amplitude A(t) goes towards zero. The multiplication by sin β and division by A(t) is accordingly carried out at the signal inputs with the signals $x_1$ and $x_2$. This is also rational because location is in the low-frequency range at this point.

Figure 6:
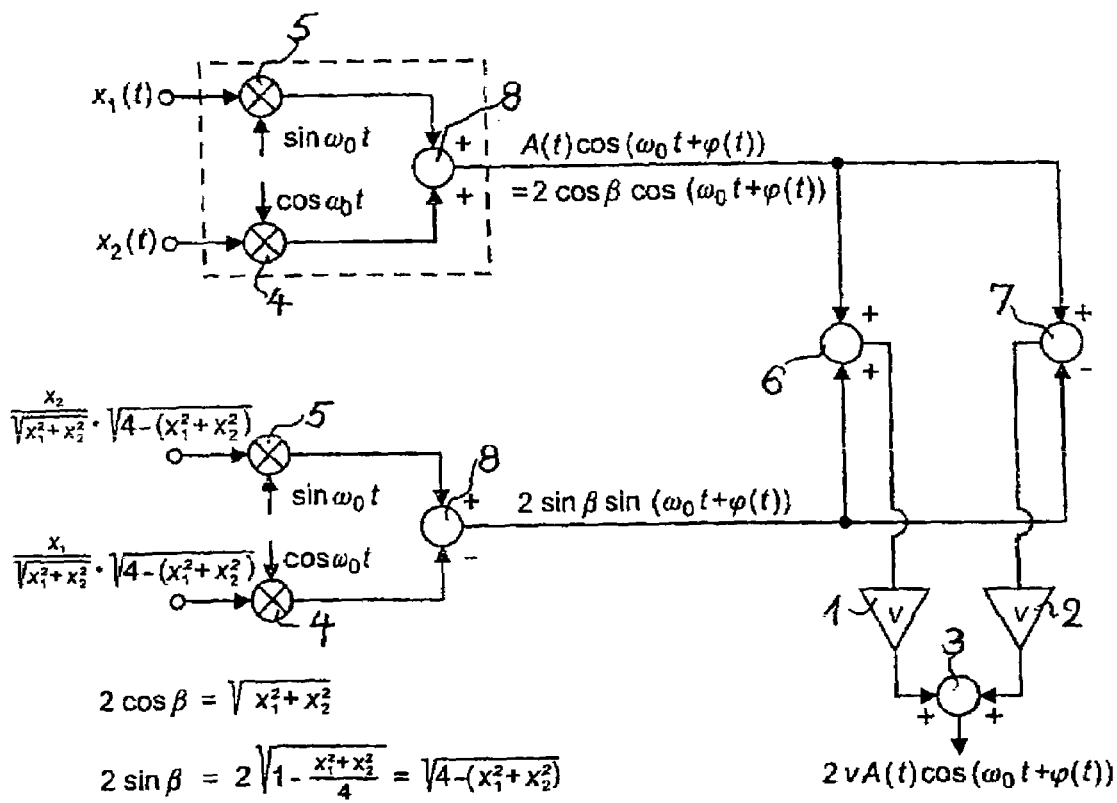
FIG. 6 shows an arrangement for obtaining a signal of constant amplitude.

The arrangement according to this idea is shown in FIG. 6 in the lower branch of the circuit. If $x_1$ and $x_2$ approach the value zero (A(t) goes towards zero), then expressions of the form 0/0 result as the following mathematical exposition confirms:

$$x_1; x_2 \to 0$$

$$\lim_{x_1, x_2 \to o} \frac{x_1(t)}{A(t)} \text{ and } \lim_{x_1, x_2 \to o} \frac{x_2(t)}{A(t)}$$

This can be achieved in simple manner by use of Taylor's series expansion in the time t of $x_1(t)$ and $x_2(t)$. It is to be noted that $$\lim_{A(t)\to o} \frac{dA(t)}{dt} < 0$$

and when the amplitude is reduced there is derivable from the above expressions:

$$\lim_{x_1,x_2\to o} \frac{x_1}{\sqrt{x_1^2+x_2^2}} = \frac{\dot{x}_1}{-\sqrt{\dot{x}_1^2+\dot{x}_2^2}}$$

$$\lim_{x_1,x_2\to o} \frac{x_2}{\sqrt{x_1^2+x_2^2}} = \frac{\dot{x}_2}{-\sqrt{\dot{x}_1^2+\dot{x}_2^2}}$$

wherein $\dot{x} = \frac{dx}{dt}$.

If $x_1$ and $x_2$ are scanning values during a time interval T and 0 in the proof n ($x_{1,n}=x_{2,n}=0$), the following derivations can be stated:

$$\dot{x}_{1,n} = \frac{x_{1,n} - x_{1,n-1}}{T} = \frac{-x_{1,n-1}}{T}$$

and $$\dot{x}_{2,n} = \frac{x_{2,n} - x_{2,n-1}}{T} = \frac{-x_{2,n-1}}{T}$$

The magnitude of the limit value is therefore $$\lim_{x_1,x_2\to o} \frac{x_1}{\sqrt{x_1^2+x_2^2}} = \frac{x_{1,n-1}}{\sqrt{x_{1,n-1}^2+x_{2,n-1}^2}}$$

and $$\lim_{x_1,x_2\to o} \frac{x_2}{\sqrt{x_1^2+x_2^2}} = \frac{x_{1,n-1}}{\sqrt{x_{1,n-1}^2+x_{2,n-1}^2}}$$

These are the values of the last proofs in the case $x_1=x_2=0$. For the case that the envelope curve signal A(t) goes towards zero, the same boundary considerations can be employed.

In the case of a boundary transition, $x_1(t)$ and $x_2(t)$ must consequently be replaced by difference values:

$$x_1 \to \frac{-\dot{x}_1}{\sqrt{\dot{x}_1^2+\dot{x}_2^2}} \text{ and } x_2 \to \frac{-\dot{x}_2}{\sqrt{\dot{x}_1^2+\dot{x}_2^2}} \text{ for } x_1, x_2 \to 0$$

$$\dot{x}_1 = \frac{dx_1}{dt} \quad \dot{x}_2 = \frac{dx_2}{dt}$$

These derivations can be obtained from the stored scanning values of the signals x by subtraction of adjacent x values. If the x values fall below a threshold no longer able to be processed the difference values are used instead thereof. Calculation of the modified input signals can either be carried out in a DSP or the recalculated signals can be filed a table for the occurring x values (Table Look-up). The equation 2 cos β and 2 sin β is indicated in the formulae, as are the modified input signals of the second branch. The output signals of the upper and lower branch are fed to the adder 6 and the subtracter 7, which form the FM1 and FM2 signals in correspondence with FIGS. 2 and 3. Processing thereof takes place as indicated.

Figure 7:
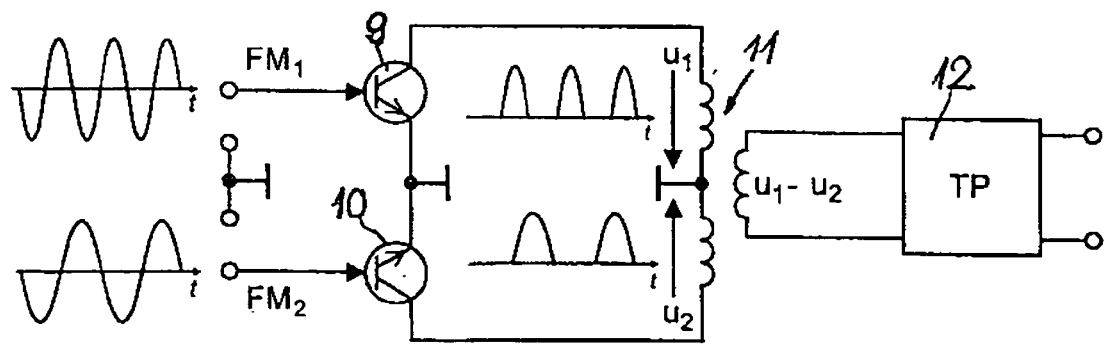
FIG. 7 shows an arrangement with a differential transformer

As amplifier for the FM signals there is proposed, according to FIG. 7, a push-pull end stage in class C operation, which consists of the transistors 9 and 10 and the transformer 11. Input signals of such push-pull end stages are usually signals which are equal, but different in sign. This is usually achieved by a differential transformer or complementary transistors. Here the input signals are the two FM signals (FM1 and FM2) which are amplified in class C operation and the difference of which appears as the output signal.

In FIG. 7 there is shown an arrangement with a differential transformer 11. Obviously an arrangement with complementary transistors can also be used. The push-pull end stage can also operate in pure switching operation. Since the difference is now formed, instead of the sum as in FIG. 6, the inputs of the subtracter 7 shown at the above right have to be interchanged. The amplified signals exhibit, apart from the fundamental oscillation, also harmonics. These should be suppressed by a filter 12. The base frequency lies in the region of, for example, 900 MHz and thus the first harmonic at 1800 MHz. This means that the filtering can be undertaken by a very simple means. Thus, an oscillator circuit, existing parasitic capacitances or additional capacitances, in some circumstances even an antenna matching network, can be used.

The invention claimed is:

1. A method of signal processing of an amplitude-modulated or phase-modulated high-frequency signal (RF signal), comprising the steps of:
    (a) breaking the RF signal down into two signals (FM1 and FM2) by relative phase displacement by an angle of +β and −β;
    (b) amplifying the signals to form two amplified signals;
    (c) adding the amplified signals to form a transmission signal,
    wherein:
    step (a) comprises multiplying a phase-modulated RF signal with constant envelope curve in a first branch by cos β and in a second branch by sin β and the two signals FM1, FM2, are obtained by respective summation and subtraction of the multiplied signals;
    the RF signal is obtained from two amplitude-modulated and phase-modulated input signals ($x_1(t)$, $x_2(t)$) by quadrature modulation, wherein the individual signals after modulation by a sine and a cosine are added;
    the input signals ($x_1(t)$ and $x_2(t)$) are scanning values; and
    in the case of approach of the scanning values of the input signals ($x_1$ and $x_2$) towards or through zero or when an envelope curve signal (A(t)) goes towards or through zero the received signals($x_1$, $x_2$) are replaced by input signals modified by means of subtraction of adjacent scanning values.

2. Method according to claim 1, wherein the RF signal is an orthogonal phase-modulated signal with constant or varying envelope curve.

3. Method according to claim 1, wherein the RF signal is formed from two orthogonal phase-modulated input signals ($x_1(t)$, $x_2(t)$) which after modulation by a sine or cosine are subtracted from one another.

4. Method according to claim 1, wherein one of the two input signals is zero when the method is used for a pure amplitude-modulated signal.

5. Method according to claim 1, wherein the modulation is carried out on the basis of carrier frequency and the carrier frequency is a quarter of a scanning frequency of the input signals.

6. Method according to claim 1, wherein the scanning values of the modified input signals are calculated in a digital signal processor.

7. Method according to claim 1, wherein the scanning values of the input signals and the associated modified input signals are filed in a table and the modified input scanning values are read out of the table as substitute value when a specific predetermined threshold of the amplitude value is formed below.

8. Method according to claim 1, wherein the signals after separate amplification are added to form a common signal and subtracted from one another.

9. Method according to claim 8, further comprising filtering the signal following amplification to suppress upper harmonic waves of fundamental oscillations of the signal.

10. Method according to claim 1, wherein the modulated RF signal is buffered.

11. Circuit arrangement for carrying out the method according to claim 1, comprising a signal splitting circuit which splits the RF signals into two signals (FM1 and FM2) and by two downstream non-linear amplifiers (1, 2), the outputs of which are connected with inputs of an adder (3) or a subtracter (11), at the output of which the desired signal can be tapped, wherein in the signal splitting circuit a multiplier (4) is contained in the first branch and multiplies the RF signal by $\cos \beta$ and a multiplier (5) is present in the second branch and multiplies the RF signal by $\sin \beta$ and wherein the inputs of an adder (6) and a subtracter (7) arranged parallel thereto are respectively connected with the outputs of the multipliers (4, 5), the outputs of the adder and subtracter being connected with the non-linear amplifiers (1, 2);

wherein:
the RF signal is obtained from two amplitude-modulated and phase-modulated input signals ($x_1(t)$, $x_2(t)$) by quadrature modulation, wherein the individual signals after modulation by a sine and a cosine are added; the input signals ($x_1(t)$ and $x_2(t)$) are scanning values; and
in the case of approach of the scanning values of the input signals ($x_1$ and $x_2$) towards or through zero or when an envelope curve signal ($A(t)$) goes towards or through zero the received signals ($x_1$, $x_2$) are replaced by input signals modified by means of subtraction of adjacent scanning values.

12. Circuit arrangement according to claim 11, wherein the RF input signal is formed from two input signals ($x_1(t)$ and $x_2(t)$), wherein provided in the first branch of the first input signal ($x_1(t)$) is a multiplier, to one input of which the first input signal ($x_1(t)$) is applied and to the second input of which a $\sin \omega_0 t$ signal is applied as multiplicant, wherein the output signal is applied to an input of said adder, wherein the second input signal ($x_2(t)$) in the second branch is applied to one input of a multiplier (4), to the second input of which a $\cos \omega_0 t$ signal is applied as multiplicant, wherein the output of the multiplier (4) is connected with the second input of the adder and wherein the FM signal ($A(t) \cos (\omega_0 t + \Phi(t))$) can be tapped at the output, which signal is applied to the input of the downstream adder (6) and subtracter (7), respectively.

13. Circuit arrangement according to claim 11, wherein two input signals are applied to two inputs of a further circuit arrangement and are formed substantially by division of the input signals ($x_2(t)$ and $x_1(t)$) by the amount value $A(t)$, wherein in one branch there is provided a multiplier (5) in which the division signal derived from the input signal ($x_2(t)$) is multiplied by the multiplicant $\sin \omega_0 t$ and the output of which is connected with the input (+) of a subtracter, wherein in the second branch there is provided a multiplier (4) which multiplies the division signal derived from the input signal ($x_1(t)$) by the multiplicant $\cos \omega_0 t$ and the output of which is connected with the second input (−) of the subtracter, and wherein the RF signal ($A(t) \sin(\omega_0 t + \Phi(t))$) can be tapped at the output of the subtracter.

14. Circuit arrangement according to claim 13, wherein the further circuit arrangement is coupled with the signal splitting circuit by way of the downstream adder (6) and subtracter (7), from the outputs of which the signals (FM1 and FM2) can be tapped.

15. Circuit arrangement according to claim 11, wherein the amplifiers (1, 2) for the signals (FM1 and FM2) are push-pull end stages (9, 10, 11) which operate in class C operation, wherein the input FM signals are two signals which are equal, but differ in sign, and wherein an output difference signal, which is applied to the respective input of the adder or subtracter, can be tapped at the output of the amplifier.

16. Circuit arrangement according to claim 15, wherein the push-pull end stage (9, 10, 11) comprises an output transformer (11) which is coupled with a filter, which suppresses the harmonics of the fundamental oscillation of the amplified signals.

17. Circuit arrangement according to claim 15, wherein the push-pull end stage (9, 10, 11) operates in pure switching mode.

* * * * *